(12) United States Patent
Cheng et al.

(10) Patent No.: US 11,528,303 B2
(45) Date of Patent: Dec. 13, 2022

(54) METHOD AND SYSTEM FOR RESPONDING TO VIDEO CALL SERVICE

(71) Applicant: PING AN TECHNOLOGY (SHENZHEN) CO., LTD, Guangdong (CN)

(72) Inventors: Huilin Cheng, Guangdong (CN); Dechao Liu, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 93 days.

(21) Appl. No.: 16/644,456

(22) PCT Filed: Jul. 27, 2018

(86) PCT No.: PCT/CN2018/097452
§ 371 (c)(1),
(2) Date: Mar. 4, 2020

(87) PCT Pub. No.: WO2019/218474
PCT Pub. Date: Nov. 21, 2019

(65) Prior Publication Data
US 2021/0377323 A1    Dec. 2, 2021

(30) Foreign Application Priority Data

May 14, 2018 (CN) .......................... 201810457629.7

(51) Int. Cl.
*H04L 65/402* (2022.01)
*H04L 67/06* (2022.01)
(Continued)

(52) U.S. Cl.
CPC .......... *H04L 65/4025* (2022.05); *H04L 67/06* (2013.01); *H04L 67/55* (2022.05); *H04W 24/02* (2013.01)

(58) Field of Classification Search
CPC ..... H04L 65/4023; H04L 67/06; H04L 67/26; H04L 67/104; H04L 65/1069; H04W 24/02; H04N 21/4788
See application file for complete search history.

(56) References Cited

U.S. PATENT DOCUMENTS

2006/0172766 A1* 8/2006 Kim .................... H04M 7/12
                                                          725/62
2008/0222688 A1* 9/2008 Han .................... H04N 21/4223
                                                          725/106

(Continued)

FOREIGN PATENT DOCUMENTS

CN          102104774 A       6/2011
CN          105205704 A      12/2015
(Continued)

OTHER PUBLICATIONS

English Translation of International Search Report for Application No. PCT/CN2018/097452.

(Continued)

*Primary Examiner* — William G Trost, IV
*Assistant Examiner* — Adam A Cooney
(74) *Attorney, Agent, or Firm* — Soroker Agmon Nordman Pte Ltd (57) ABSTRACT

The present disclosure provides a method for responding to video call service and system, including: receiving a video call service request by the video call device; calling a video call connection process to establish a video call data transmission link with the call peer based on a communication address; locally acquiring a target file as indicated by the file transmission request, and determining a link number of the file transmission link for transmitting the target file according to the communication address and a file type of the target file, if a file transmission request sent by the call peer is received; uploading the target file to a file push server (Continued)

through a file uplink if the link number is not included in a local link list; and transmitting the target file to the call peer through the file transmission link corresponding to the link number.

12 Claims, 4 Drawing Sheets

(51) Int. Cl.
*H04L 67/55* (2022.01)
*H04W 24/02* (2009.01)

(56) References Cited

U.S. PATENT DOCUMENTS

| | | | |
|---|---|---|---|
| 2010/0064025 A1* | 3/2010 | Nelimarkka | H04N 21/6581 715/202 |
| 2010/0199335 A1 | 8/2010 | Ooki | |
| 2010/0208634 A1* | 8/2010 | Eng | H04L 45/302 370/352 |
| 2012/0260298 A1* | 10/2012 | Chen | H04N 21/4788 725/114 |
| 2014/0280562 A1* | 9/2014 | Shields | H04L 65/1069 709/204 |
| 2015/0058215 A1* | 2/2015 | Johnson | G06Q 20/1085 705/43 |
| 2015/0334251 A1* | 11/2015 | Grabowich | H04M 15/8044 455/406 |
| 2016/0127683 A1* | 5/2016 | Hanson | G06Q 30/00 348/14.08 |
| 2018/0048621 A1* | 2/2018 | Yiu | H04L 65/1069 |
| 2018/0255074 A1* | 9/2018 | Li | G06F 21/50 |
| 2018/0309801 A1* | 10/2018 | Rathod | H04L 65/1069 |

FOREIGN PATENT DOCUMENTS

| | | |
|---|---|---|
| CN | 106559806 A | 4/2017 |
| CN | 206301383 U | 7/2017 |

OTHER PUBLICATIONS

International Search Report for Application No. PCT/CN2018/097452.
Written Opinion for Application No. PCT/CN2018/097452.
English Machine Translation to Abstract CN206301383.
English Machine Translation to Abstract CN106559806.
English Machine Translation to Abstract CN105205704.
English Machine Translation to Abstract CN102104774.

* cited by examiner

METHOD AND SYSTEM FOR RESPONDING TO VIDEO CALL SERVICE

CROSS-REFERENCE TO RELATED APPLICATION

The present application is a National Stage of PCT Application No. PCT/CN2018/097452 filed on Jul. 27, 2018, which claims priority to Chinese Patent Application No. 201810457629.7, filed on May 14, 2018, and entitled "a method and system for responding to video call service", the contents each of which are incorporated in the present application by reference in their entirety.

TECHNICAL FIELD

The present disclosure relates to the technical field of Internet, and more particularly to a method for responding to video call service and a system for responding to video call service.

BACKGROUND

With the continuous development of video call technologies, more and more services support using instant video call to perform business transaction. In the process of performing business transaction using video call, the user is often required to provide relevant data, for example, the user is required to present his/her identity card, bank card and the like, an account executive who performs the video call with the user may store resources provided by the user. In the existing video call service transaction process, due to the fact that the user and the account executive are often located at different servers, a file transmission cannot be directly performed, thus, an approach of acquiring relevant file resources by the account executive is generally realized by capturing a video picture. However, the quality of the file resources acquired according to this approach is directly associated with a picture resolution of the video call, the account executive may not even acquire effective user resources in the event that the video call is performed with low resolution due to insufficient bandwidth resources. It is obvious that, when a video call service transaction is performed, the requirement of network bandwidth resources is much higher, and thus the effectiveness and the stability of acquisition of user files are much lower.

Technical Problem

In view of this, embodiments of the present disclosure provide a method and device for responding to video call service, which aim at solving a technical problem in the prior art that the requirement of network bandwidth resource is much higher, so that the effectiveness and the stability of acquisition of user files are much lower, when the video call business transaction is performed.

Technical Solution

In one aspect, embodiments of the present disclosure provide a method for responding to video call service being applied to a system for responding to video call service, the system for responding to video call service comprises a video call device and a file push server, and the method for responding to video call service includes:

receiving a video call service request by the video call device, the video call service request comprises a communication address of a call peer;

calling a video call connection process to establish a video call data transmission link with the call peer by the video call device based on the communication address, in response to the video call service request;

locally acquiring a target file as indicated by the file transmission request, and determining a link number of the file transmission link for transmitting the target file according to the communication address and a file type of the target file by the video call device, if a file transmission request sent by the call peer is received;

establishing a file uplink with the file push server and uploading the target file to the file push server through the file uplink by the video call device, if the link number is not included in a local link list; the local link list is configured to record link numbers of various transmission links under a server which the video call device is affiliated to; and transmitting the target file to the call peer through the file transmission link corresponding to the link number by the file push server.

Advantageous Effects of the Present Disclosure

According to the embodiment of the present disclosure, when the video call service request is received, the video call connection process is called to establish and realize the video call data link with the call peer, and data generated in the video call process is transmitted through the video call data link; the link number of the file transmission link for transmitting the target file is determined on the basis of the communication address of the call peer and the file type when a file needs to be transmitted to the call peer in the video call process; when it is determined that the link number is not included in the local link list, it indicates that the call peer and the terminal device are located in different servers, so that the acquired target file is uploaded to the file push server, and the target file is sent to the call peer through the file push server. Compared with the existing video call service transaction method, the file transmission link and the video call data transmission link are mutually independent, and the value of the resolution of the video call does not influence the qualities of the file resources that need to be required. In another aspect, the file push server is used to forward the target file across servers, a mutual file transmission between the user and the account executive is realized, either, and the effectiveness and the stability of acquisition of user file are improved.

DESCRIPTION OF THE EMBODIMENTS

Figure 1:
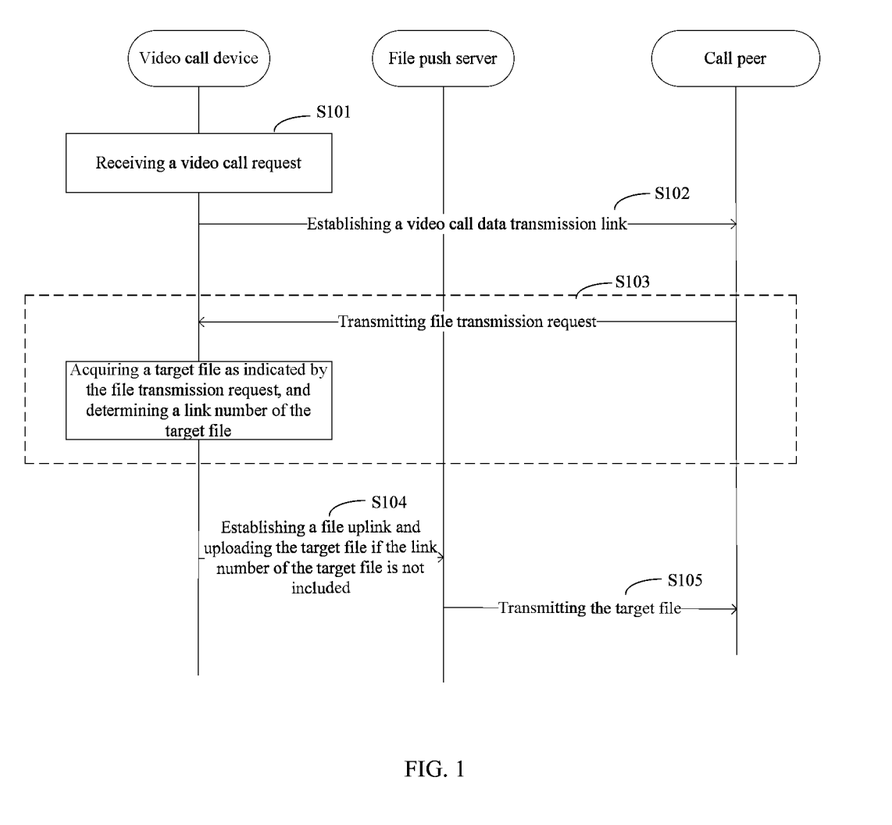
FIG. 1 depicts an interactive flow diagram of a method for responding to video call service provided by embodiment one of the present disclosure.

In the embodiment of the present disclosure, the executive subject of the process is a system for responding to video call service. The device for responding to video call service includes a video call device and a file push server, where a subscription relationship is established between the video call device and the file push server, file data may be uploaded to the file push server and a file sent by the file push server may be received. The file push server may push the received file to all servers and devices in a file push list, thereby realizing a file publishing function. Particularly, the file push server may be a server built based on a Redis database. FIG. 1 depicts an interactive flow diagram of a method for responding to video call service provided by embodiment one of the present disclosure, which is described in detail below:

Step 101, receiving a video call service request by the video call device, where the video call service request includes a communication address of a call peer.

In this embodiment, the video call service request may be sent to the video call device through the call peer, that is, the video call device is called by the call peer; a user may also generate a video call service request on the video call device, in the case, it is the video call device which calls the call peer. It needs to be noted that, there may be one, two, or more than two call peers, due to the fact that IP video call service supports a multiplayer video call, that is, the video call device may simultaneously submits a video call service request to multiple call peers, however, the processes of establishing video call links are mutually independent. Thus, in this embodiment, the present disclosure is described by taking establishment of video call service between the video call service and one call peer as an example, the process of performing video call with multiple call peers may be referred to the example mentioned above, it is not described one by one herein.

In this embodiment, the video call service request includes a communication address of the call peer, this communication address may be an IP address. Preferably, the communication address may also be an identifier of SIP (Session Initiation Protocol) server of the call peer, which determines with which SIP server should the video call link be established. When the video call device establishes a video call link with the SIP server at the side of call peer, an instant video call may be performed with the call peer by the SIP server.

S102, calling a video call connection process to establish a video call data transmission link with the call peer based on the communication address by the video call device, in response to the video call service request.

In this embodiment, after determining the communication address with the call peer, the device of responding to video call service may establish a video call data link with the call peer based on the communication address in response to the video call service request. The method for establishing video call data link particularly includes: in response to the video call connection process which is built in the device of responding to video call service, executing protocol files as required by the video call through the call connection process, adjusting a destination address in the protocol files as the communication address of the call peer so as to create a video call environment between the call peer and the video call device, and performing a handshake operation to establish the video call data link after the video call environment has been created. The protocol files for creating the video call environment include protocol files related to multiple network layers, such as a protocol file based on application layer, a port number of application layer that needs to be called, and a packaging rule of data package; the protocol files for creating the video call environment may also include protocol files in the transmission layer, the determination of whether the reception of voice data package is performed based on a TCP (Transmission Control Protocol) or a UDP (User Datagram Protocol) and further include protocol files of the network layer, the protocol files of the network layer may include routing table information corresponding to the communication address connection, etc.

Optionally, in this embodiment, the video call data transmission link is a full-duplex transmission link, that is, users at two sides may simultaneously output and receive video data simultaneously, in order to determine the completeness of data links received in two directions, the video call device and the call peer may send test data synchronously, if the video call device and the call peer may receive the test data in preset time, it means that the call data transmission link has been established, receiving links in two directions is abnormal, and the instant voice call may be performed.

Optionally, in this embodiment, the video call connection process may also create a video call operation interface and display the video call operation interface on a display module of the video call device, so that the user sends an instruction to the call peer in the video call process through the video call operation interface or responds to an instruction sent by the call peer.

In this embodiment, this video call device may perform video call with the call peer to complete a response operation of the video call service request through the video call data transmission link after the video call data transmission link is established.

Step 103, acquiring, if a file transmission request sent by the call peer is received, a target file corresponding to the file transmission request locally, and determining a link number of a file transmission link for transmitting the target file by the video call device according to the communication address and the file type of the target file.

In this embodiment, in the process of performing video call by the video call device, the video call device may send a file transmission request to request the video call device to upload the corresponding target file. Of course, when the user needs to send a target file to the call peer, a file transmission request may also be generated by a local video call device. After receiving the file transmission request, the video call device may analyze the request to determine a required target file, and calls a corresponding local module to acquire the target file. For example, if the call peer needs to acquire an image of head portrait of the user, the video call device may call a camera module to perform a face recognition on the acquired image information; if a face image is recognized in the image information acquired at a certain moment, the image information corresponding to this moment is captured to serve as the image of heard portrait of the user, and is identified as the target file corresponding to the file transmission request. Optionally, if the file transmission request contains a file identifier of the target file, the video call device queries files stored in the local database based on the file identifier, extracts the file corresponding to the file identifier and serves the extracted file corresponding to the file identifier as the target file.

In this embodiment, after the target file is acquired by the video call device, the file type of the target file is determined, the target device of the target file may be determined according to the communication address acquired in step 101, the interface/port used for transmitting the target file may be determined through the file type, so that the link number of the file transmission link used for transmitting the target file may be acquired based on the two information.

In this embodiment, coding rules of link codes used by the various devices are the same, thus, the coding rule is not only applicable for the video call device to code the data transmission link contained by the video call device, but also applicable for other devices. Where the coding rule of the link coding may be downloaded from an upper computer corresponding to the video call device, in this case, the upper machine may broadcast the coding rule of the link coding to all devices within the network to achieve the purpose of unification of link coding rules. Optionally, the upper computer is provided with a coding update condition, if the current moment is detected to meet the preset coding update condition, for example, if a new device is added into the network or reaches the coding updating period, the updated coding rule will be broadcasted so as to realize the purpose of update of the coding rule.

Optionally, in this embodiment, the method of generating a link code by the video call device based on the communication address and the file type may be as follows: the file type is cross-inserted according to a preset cross-encoding algorithm and on the basis of the communication address, so that the link number is acquired. Optionally, the link coding rule may also be a hash function, the first server inputs the communication address and the file type into the hash function so as to output the link number corresponding to the two parameters.

In this embodiment, the video call device may send a local link list acquisition request to the server which the video call device is affiliated to, this server may collect link numbers of transmission links of all ports thereof, generate a local link list, and return the local link list to the video call device. After determining the link code used for transmitting target file, the video call device may detect whether the link code is in the local link list. If the link list is in the local link list, it indicates that target message may be transmitted to the corresponding call peer through the server which the video call device is affiliated to, there is no need to perform a cross-server file transmission, the call peer is within the local area network where the video call device lies, in this situation, the server which the video call device is affiliated to determines the file transmission link corresponding to the link code and transmits the target file acquired by the video call device to the call peer through the file transmission link, there is no need to upload the target file to the file push server; otherwise, if the link coding is not in the local link list, it indicates that this situation belongs to cross-server information interaction, step 104 is performed.

Step 104, establishing a file uplink between the video call device and the file push server and uploading the target file to the file push server through the file uplink by the video call device, if the link number is not included in the local link list; the local link list is configured to record link numbers of various transmission links under the server which the video call device is affiliated to.

In this embodiment, if the link code is not included in the local link list, it indicates that the call peer is disconnected with the server which the video call device is affiliated to, and a cross-server file transmission needs to be performed. In this case, the video call device may establish a file uplink with the file push server, this file uplink and the video call data transmission link are two mutually independent links, so that a call quality of the video call does not influence the uploaded file. After the file uplink is established, the video call device may upload the target file to the file push server, and push the target file to various devices having established subscription relationship with the file push server through a pushing function of the file push server.

Step 105, transmitting the target file to the call peer through the file transmission link that corresponds to the link number by file push server.

In the embodiment, the call peer has established the subscription relationship with the file push server, so that the link number of the file transmission link for transmitting the target file to the call peer is recorded in a link list of the file push server. The file push server determines the file transmission link corresponding to the link number based on the link number corresponding to the target file and transmits the target file to the call peer through the file transmission link after receiving the target file, thereby achieving the purpose of cross-server file transmission.

Optionally, the file push server stores the target file in a corresponding database based on the device identification of the video call device. The call peer may proactively establish a file transmission link with the file push server and reacquire the target file from a database corresponding to the video call device.

As can be seen from the above, in the method for responding to the video call service provided in this embodiment of the present disclosure, the file transmission link and the video call data transmission link are mutually independent, and the resolution of the video call does not make influence on the quality of the required file resource. In another aspect, the target file is forwarded across servers through the file push server, so that a mutual file transmission between the user and the account executive is realized, and the effectiveness and the stability of acquisition of user file are improved.

Figure 2:
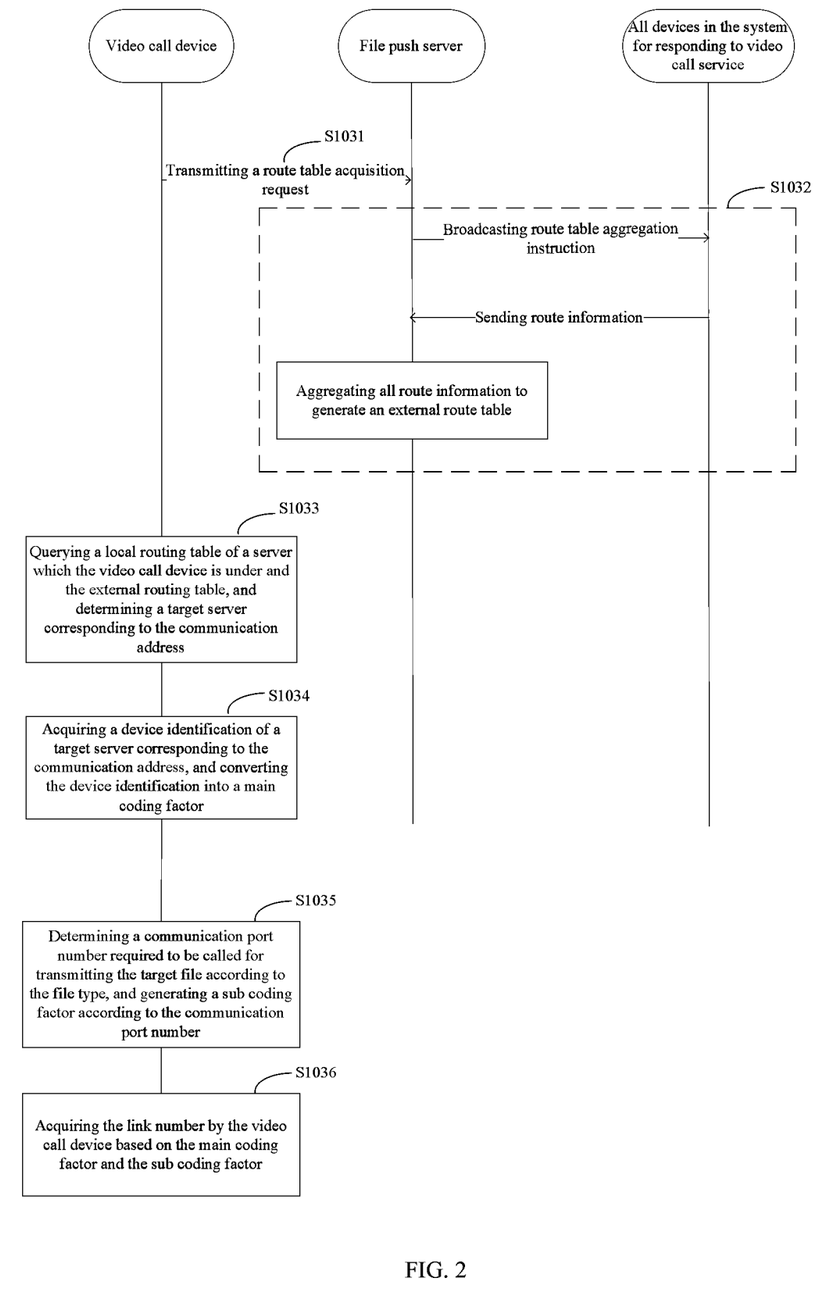
FIG. 2 depicts a detailed interactive flow diagram of a step 103 in a method for responding to video call service provided by embodiment two of the present disclosure.

FIG. 2 depicts a specific interactive flow diagram of a step 103 in the method for responding to video call service provided by embodiment two of the present disclosure. As shown in FIG. 2, as compared to the embodiment shown in FIG. 1, the method for responding to the video call service provided by this embodiment includes steps 1031-1036, which are described in detail as follows:

Step 1031, transmitting a routing table acquisition request to a file push server by a video call device.

In this embodiment, after a communication address of a call peer is determined, since the video call device only records address information of terminal devices connected to various ports of the server which the video call device is affiliated to, however, the call peer may not be necessarily connected to any port of the local server. In this case, the video call device also needs to acquire an external routing table. Therefore, the video call device may send a routing table acquisition request to the file push server to collect routing information of all devices which have the subscription relationship with the file push server through the file push server.

In this embodiment, the video call device may establish the subscription relationship with a plurality of file push servers simultaneously, in this case, the video call device may establish a communication link with the plurality of file push servers respectively, and transmit the routing table acquisition request to each of the plurality of file push servers. According to the approach mentioned above, when it is determined that the call peer is disconnected with the local server, and files needs to be forwarded through the file push server, the target information may also be sent to the file push server corresponding to target address, so that an information push efficiency is improved, and a condition of invalid uploading is avoided.

Step 1032, broadcasting routing table aggregation instruction to all devices in the system for responding to the video call service, receiving the routing information as returned by all these devices, aggregating all routing information, and generating an external routing table by the file push server.

In this embodiment, the file push server may generate a routing table aggregation instruction and broadcast the routing table gathering instruction to all devices connected with it after the routing table acquisition request is received, such that these devices which have established a subscription relationship with the file push server return their own routing information.

In this embodiment, when the routing table aggregation instruction is received by the video call device having the subscription relationship with the file push server, this video call device may acquire the network address of the various ports, generate the route information corresponding to the device and return the route information to the file push server. After receiving the routing information as returned by all these devices, the file push server may aggregate all routing information to generate the external routing table. Optionally, the file push server may be set to have maximum waiting time; a waiting timer may be started after the file push server broadcasts the routing table aggregation instruction to all these devices; if the routing information is stilled not returned by the device even though the waiting timer reaches the maximum waiting time, the external routing table is generated on the basis of the currently received routing information, and the device which fails to return the routing information is identified as abnormal, and an abnormal operation is performed.

Step 1033, receiving the external routing table sent by the file push server, and querying the local routing table of the server which the video call device is affiliated to and the external routing table to determine the target server corresponding to the communication address by the video call device.

In this embodiment, the information push server may send the external routing table to the video call device after generating the external routing table, afterwards, the video call device queries whether the communication address of the target information is included in the local routing table which records the routing information of the ports and the external routing table, then, the device to which the communication address corresponds to may be determined, and the device identification of the call peer may be determined.

Step 1034, acquiring a device identifier of a target server that corresponds to the communication address and converting the device identifier into a main encoding factor by the video call device.

In this embodiment, after determining the device identification of the call peer, the video call device may generate the main encoding factor for determining the link number according to the device identifier. It needs to be noted that, the main coding factor has uniqueness. Since different devices have different device identifiers, the output main coding factors after conversion are different, if the main coding factors correspond to two links that are the same, it means that the two call peers corresponding to the two link codes are the same device. However, due to the fact that the sub-coding factors are determined based on the port numbers used for transmitting target files, the ports used for transmitting the same type of files by different devices may be identical, so that the sub-coding factors corresponding to different devices may be identical and don't have uniqueness.

In this embodiment, the method of generating main coding factors according to device identifier may be implemented in this way: a conversion algorithm of the main coding factor is stored in the video call device, the conversion algorithm may be a hash function, the video call device inputs the device identification into the conversion algorithm, so that the corresponding main coding factor may be output. Preferably, the video call device may directly use the device identifier as the main coding factor or select the content with fixed field in the device identifier as the main coding factor.

Step 1035, determining a communication port number required to be called for transmitting the target file according to the file type and generating a sub-coding factor according to the communication port number by the video call device.

In this embodiment, the video call device may also determine the file type of the target file. In the process of performing data interaction with different file types, the network protocols to be used are different from each other; for example, regarding a webpage file, the used network protocol is mainly a HTTP (Hyper Text Transmission Protocol), the used port number is 80, however, regarding a mail file, the mainly used port number is the SMTP (Simple Mail Transfer Protocol), and the corresponding port number is 25. Thus, different network protocols are used in different file types, so that the port numbers which transmit the network protocols are also different. The video call device may not only need to determine the device identification corresponding to the target file, but also need to determine which port should the target file be transmitted to and generate a sub-coding factor based on the port number. Preferably, the first server may directly use the port number as the sub-coding factor.

It needs to be noted that, the steps 1031-1034 and the step 1035 are mutually independent and there is no order relation for these steps, that is, the video call device may determine the main coding factor first, the video call device may also determine the sub-coding factor first, and may also determine the two coding factors at the same time.

Step 1036, acquiring the link number based on the main coding factor and the sub-coding factor by the video call device.

In the embodiment, after determining the main coding factor and the sub-coding factor, the video call device may acquire the link number of the target file by synthesizing the two coding factors. Where the specific process of synthesizing the two coding factors may be as follows: combining the main coding factor with the sub-coding factor directly, cross-merging may also be performed. Of course, the user may set a merging method by himself or herself, after the setting is completed, this setting is synchronized to the whole network, such that the merging method of the whole network is kept consistent.

In this embodiment of the present disclosure, the link code is output after the main coding factor and the sub-coding factor of the link code are determined, such that the link code has uniqueness, the target device that requires file transmission and the port required to be used may be accurately determined, and an accurate transmission is realized.

Figure 3:
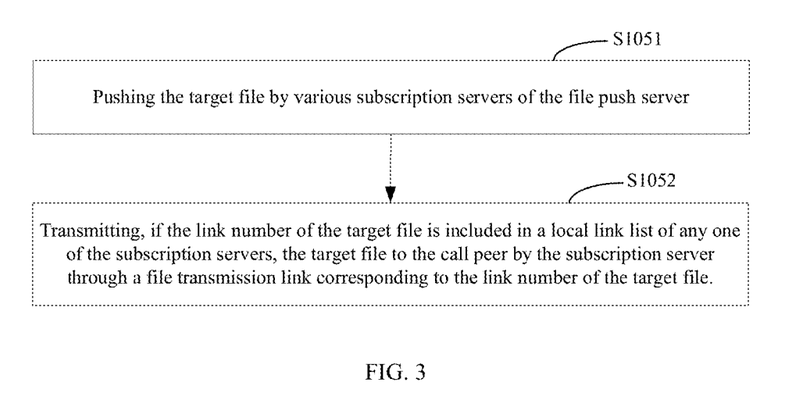
FIG. 3 depicts a flow diagram of concrete implementation of a step 105 in a method for responding to video call service provided by embodiment three of the present disclosure.

FIG. 3 depicts a flow diagram of specific implementation of a step 105 in a method for responding to video call service provided by embodiment three of the present disclosure. As shown in FIG. 3, as compared to the embodiment shown in FIG. 1, the step 105 in the method for responding to video call service comprises steps 1051-1052, which are described in detail as follows:

Further, the system for responding to video call service further includes at least one subscription server having a subscription relationship with the file push server;

transmitting the target file to the call peer through the file transmission link corresponding to the link number by the file push server includes:

Step 1051, pushing the target file by plurality of subscription servers having the relationship with the file push server.

In this embodiment, the file push server stores an information push list, and various subscription servers which have established the subscription relationship with the file push server are recorded in the file push list. Of course, the file pushing list may also include the video call device if the video call device has established the subscription relationship with the file push server. The file push server may push the target file to the various subscription servers to realize information pushing operation after receiving the target file. Optionally, the file push server is provided with a push triggering condition; for example, whether current moment reaches a preset pushing period is detected, or whether the total data amount of the files to be pushed exceeds a preset threshold value is determined, when the current moment is detected to meet the pushing triggering condition, the operation of pushing the target file to the various subscription servers is performed.

In this embodiment, the file push list may only record the subscription servers which have subscription relationships that are valid at the current moment, the file push list may also record server which has ever subscribed the file push server but has already cancelled the subscription with the file push server. Regarding an invalid server or an invalid terminal device which has cancelled the subscription with the file push server, the file push server may store the target files which haven't yet been pushed in cache units corresponding to these invalid servers or invalid terminal devices, when it is detected that the terminal device has re-established the subscription relationship, the files which are stored in the cache units and haven't been sent out are pushed to the terminal device.

Step 1052, transmitting the target file to the call peer through a file transmission link corresponding to the link number through the subscription server, if the link number of the target file is included in a local link list of any one of the subscription servers.

In this embodiment, if the link number of the target file is recorded in the local link list of a subscription server, it indicates that the call peer is connected with the subscription server. In this case, the subscription server may query the communication link corresponding to the link number and send the target file to the call peer through the communication link.

In this embodiment, if the link number of the target file is not recorded in the local link list of any other subscription server, it indicates that the call peer is disconnected with the subscription server; in this case, the subscription server may delete the target file. Optionally, if this subscription server has also established the subscription relationship with other file push server, in this case, the subscription server may also push the target file to the file push server which serves to forward the target file.

In this embodiment of the present disclosure, the operation of transmitting target file to all subscription servers in the whole network is performed through the file publishing function of the file push server; then, the target file is forwarded through the subscription server, in this way, a purpose of cross-server file interaction is achieved.

Figure 4:
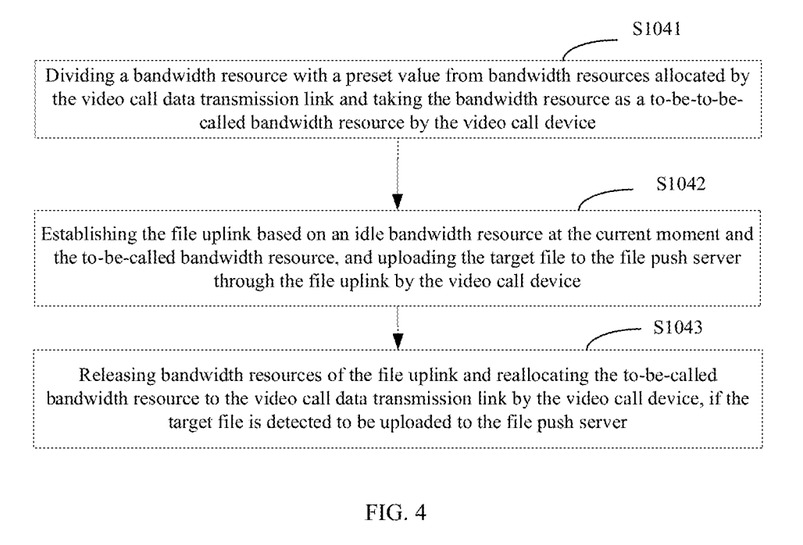
FIG. 4 depicts a flow diagram of concrete implementation of a step 104 in a method for responding to video call service provided by embodiment four of the present disclosure.

FIG. 4 illustrates a specific implementation flow diagram of a step 104 in a method of responding to video call service provided by embodiment four of the present disclosure. As shown in FIG. 4, as compared to the embodiments shown in FIGS. 1-3, the method for responding to video call service provided by this embodiment includes steps 1041-1043, which are described in detail below:

step 1041, dividing bandwidth resource with a preset value from the bandwidth resources allocated by the video call data transmission link and taking the bandwidth resource as a to-be-called bandwidth resource by the video call device.

In this embodiment, the video call device may reduce the resolution of the current video call to divide the bandwidth resources with the preset value from the video call data transmission link so as to perform a file uploading operation. It should be noted that the preset value may be determined according to the resolution of the current video call and the lowest resolution for calling, and an implementation process of determining the preset value according to the resolution of the current video call and the lowest resolution for video call is as follows: calculating the difference between the current resolution of video call and the lowest resolution for video call, and determining a redundancy rate of video call based on difference value of the two resolutions; and calculating the to-be-called bandwidth resource according to the redundancy rate.

Optionally, the video call may be converted into a voice call if the current resolution of the video call data reaches the lowest resolution for video call, and the voice call is switched into the video call to provide enough bandwidth resources to upload the target file after the file is uploaded.

Step 1042, establishing the file uplink based on the idle bandwidth resources at the current moment and the to-be-called bandwidth resource and uploading the target file to the file push server through the file uplink by the video call device.

In this embodiment, the video call device may detect available bandwidth resources (i.e., the idle bandwidth resources as mentioned above) at the current moment, and establish the file uplink between the video call device and the file push server based on the idle bandwidth resources and the to-be-called bandwidth resource which is acquired according to the dividing operation as mentioned above, the allocated bandwidth resources of the file uplink are the sum of the idle bandwidth resources and the to-be-called bandwidth resource. The target file may be sent to the file push server after the file uplink is established.

Step 1043, releasing a bandwidth resource of the file uplink and reallocating the to-be-called bandwidth resource to the video call data transmission link by the video call device, if the target file is detected to be uploaded to the file push server.

In this embodiment, after the target file is successfully sent to the file push server, the file uplink may be disconnected, and the bandwidth resources occupied by the file uplink may be released, where a part of the to-be-called bandwidth resource are called from the video data transmission link, and therefore may be redistributed to the video data transmission link. The resolution of the video call may also be restored to the value before the dividing of bandwidth resource.

In this embodiment of the present disclosure, by dynamically adjusting bandwidth resources, the bandwidth resources allocated by the video call are reduced to increase the file transmission rate when files need to be uploaded, such that a file transmission operation is more flexible, and video call service transaction efficiency is improved.

Figure 5:
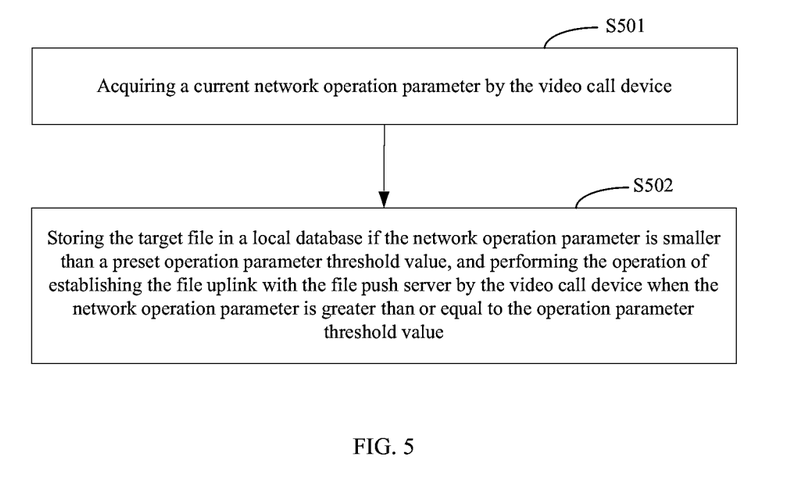
FIG. 5 depicts a flow diagram of concrete implementation of a method for responding to video call service provided by embodiment five of the present disclosure.

FIG. 5 depicts a flow diagram of concrete implementation of a method for responding to video call service provided by embodiment five of the present disclosure. As shown in FIG. 5, compared with the embodiments shown in FIGS. 1-3, the method for responding to video call service provided by this embodiment further includes steps 501 and 502 before establishing a file uplink between the video call device and the file push server, and the steps 501 and 502 are described in detail as follows:

step 501, acquiring current network operation parameters by the video call device.

In this embodiment, whether the current network environment is suitable for performing file uploading operation may be detected by the video call device before a target file is uploaded by the video call device, thus, a current network operating parameter may be acquired, and the acquired network operating parameter is compared with a preset operating parameter threshold value. If the operating parameter is greater than or equal to the preset operating parameter threshold value, an operation of establishing the file uplink with the file push server is performed; otherwise, if the operating parameter is lower than the operating parameter threshold value, step 502 is performed.

In this embodiment, the network operation parameters include but are not limited to at least one from the group consisting of transmission rate, bit error rate, signal-to-noise ratio, bandwidth occupancy rate, link interruption frequency and other parameters related to network transmission state.

In step 502, storing the target file in a local database by the video call device if the network operation parameter is lower than the preset operation parameter threshold value, and performing an operation of establishing the file uplink with the file push server by the video call device when the network operation parameter is greater than or equal to the operation parameter threshold value.

In this embodiment, if the network operation parameter is lower than the preset operation parameter threshold value, it indicates that the current network transmission state is poor, a damage of the target file or a failure of uploading of the target file may be caused due to performing of the operation of uploading target file, in this way, not only the bandwidth resources are wasted, but also buffer memory space of the file push server may be occupied, and publishing operation may be repeatedly performed on the same target file for many times. In order to avoid this situation, the video call device may store the locally acquired target file in the local database, and monitor the current network operation parameter continuously, and upload the target file to the file push server when the network operation parameter is detected to be greater than or equal to the operation parameter threshold value.

In this embodiment of the present disclosure, the network operation parameters are monitored, and uploading of the target file is performed when the monitored network operation parameter is greater than or equal to the preset operation parameter threshold value, so that a success rate of file uploading is improved.

It should be understood that, value of serial number of the steps in the aforesaid embodiment doesn't mean a sequencing of execution sequences of the steps, the execution sequence of each of the steps should be determined by functionalities and internal logics of the steps themselves, and shouldn't be regarded as limitation to an implementation process of the embodiment of the present disclosure.

Figure 6:
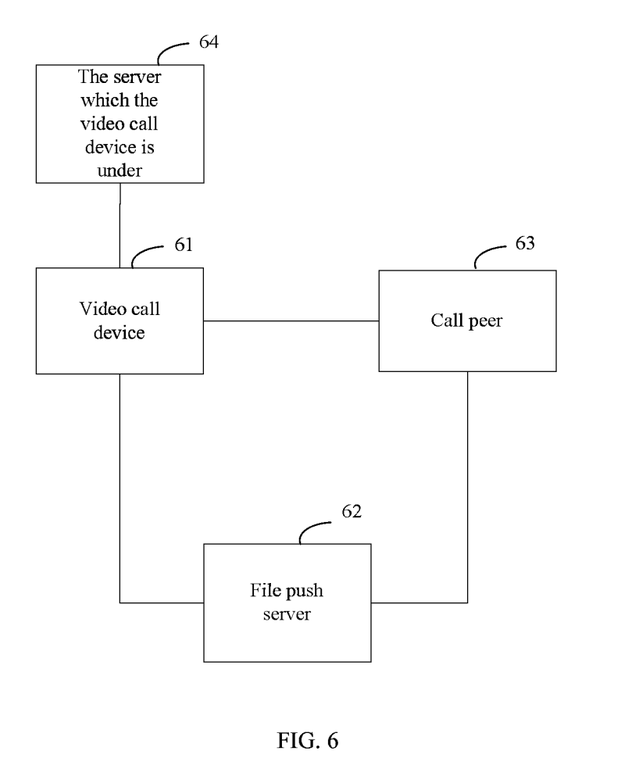
FIG. 6 depicts a structural block diagram of a system for responding to video call service provided by one embodiment of the present disclosure.

FIG. 6 depicts a structural block diagram of a system for responding to video call service according to one embodiment of the present disclosure, the system for responding to the video call service includes various video call devices configured to perform the steps in the embodiment corresponding to FIG. 1. Regarding the detail of these steps, please refer to FIG. 1 and relevant descriptions in the embodiment corresponding to FIG. 1. For the convenience of explanation, the part related to this embodiment is merely illustrated.

Referring to FIG. 6, the system for responding to video call service includes a video call device 61 and a file push server 62;

the video call device 61 is configured to receive a video call service request, where the video call service request includes a communication address of a call peer;

the video call device 61 is further configured to call a video call connection process to establish a video call data transmission link with the call peer based on the communication address, in response to the video call service request;

the video call device 61 is further configured to locally acquire, if a file transmission request sent by the call peer 63 is received, a target file as indicated by the file transmission request and determine a link number of the file transmission link for transmitting the target file according to the communication address and a file type of the target file;

the video call device 61 is further configured to establish a file uplink with the file push server 62 and upload the target file to the file push server 62 through the file uplink, if the link number is not included in a local link list; where the local link list is configured to record link numbers of various transmission links under a server which video call device 61 is affiliated to;

the file push server 62 is configured to transmit the target file to the call peer through the file transmission link corresponding to the link number.

Optionally, the video call device 61 is configured to determine a link number of the file transmission link for transmitting the target file according to the communication address and a file type of the target file by performing steps of:

transmitting a routing table acquisition request to the file push server 62;

broadcasting a routing table aggregating instruction to various video call devices in the system for responding to video call service, receiving routing information as returned by the various video call devices, and aggregating all routing information to generate an external routing table by the file push server;

receiving the external routing table sent by the file push server 62, querying a local routing table of a server which the video call device is affiliated to and the external routing table, and determining a target server corresponding to the communication address;

acquiring a device identification of a target server corresponding to the communication address and converting the device identification into a main coding factor;

determining a communication port number that needs to be called for transmitting the target file according to the file type and generating a sub coding factor according to the communication port number; and acquiring the link number based on the main coding factor and the sub coding factor.

Optionally, the system for responding to video call service further includes at least one subscription server which has a subscription relationship with the file push server 62;

the file push server 62 is configured to transmit the target file to the call peer through the file transmission link corresponding to the link number by performing steps of:

pushing the target file to various subscription servers having the subscription relationship with the file push server; and transmitting the target file to the call peer through a file transmission link corresponding to the link number of the target file by the subscription server, if the link number of the target file is included in a local link list of any one of the subscription servers.

Optionally, the video call device 61 is configured to establish a file uplink with the file push server 62 and upload the target file to the file push server 62 through the file uplink by performing steps of:

dividing a bandwidth resource with a preset value from bandwidth resources allocated by the video call data transmission link to serve as a to-be-called bandwidth resource;

establishing the file uplink based on an idle bandwidth resource at the current moment and the to-be-called bandwidth resource, and uploading the target file to the file push server 62 through the file uplink; and releasing bandwidth resources of the file uplink and reallocating the to-be-called bandwidth resource to the video call data transmission link, if the target file is detected to be uploaded to the file push server 62.

Optionally, the video call device 61 is further configured to:

acquire a current network operation parameter; and store the target file in a local database if the network operation parameter is lower than a preset operation parameter threshold value, and perform an operation of establishing the file uplink with the file push server 62 when the network operation parameter is greater than or equal to the operation parameter threshold value.

As stated above, in the system for responding to video call service of the embodiment of the present disclosure, the file transmission link and the video call data transmission link are mutually independent, the value of the resolution of the video call doesn't influence the qualities of the file resources that need to be acquired. In another aspect, the file push server 62 is used to forward the target file across servers, a mutual file transmission between the user and the account executive is realized, either, and the effectiveness and the stability of acquisition of user files are improved.

As stated above, the embodiments mentioned above only intended to explain but not to limit the technical solutions of the present disclosure. Although the present disclosure has been explained in detail with reference to the above-described embodiments, it should be understood by the ordinary skilled one in the art that, the technical solutions described in each of the embodiments mentioned above may still be amended, or some technical features in the technical solutions may be replaced equivalently; these amendments or equivalent replacements which doesn't cause the essence of corresponding technical solution to be broken away from the spirit and the scope of the technical solution in various embodiments of the present disclosure, should all be included in the protection scope of the present disclosure.

What is claimed is:

1. A method for responding to video call service being applied to a system for responding to video call service, wherein the system for responding to video call service comprises a video call device and a file push server, the video call device is configured to acquire an external routing table generated by the file push server and the method for responding to video call service comprises:

(i) receiving a video call service request by the video call device, wherein the video call service request comprises a communication address of a call peer;

(ii) calling a video call connection process to establish a video call data transmission link with the call peer by the video call device based on a communication address, in response to the video call service request;

(iii) locally acquiring a target file as indicated by a file transmission request, and determining a link number of a file transmission link for transmitting the target file according to the communication address and a file type of the target file by the video call device, if the file transmission request sent by the call peer is received;

(iv) establishing a file uplink with the file push server and uploading the target file to the file push server through the file uplink by the video call device, if the link number is not included in a local link list; wherein the local link list is configured to record link numbers of various transmission links under a server which the video call device is affiliated to; and (v) transmitting the target file to the call peer through the file transmission link corresponding to the link number by the file push server;

wherein locally acquiring the target file as indicated by the file transmission request, and determining the link number of the file transmission link for transmitting the target file according to the communication address and the file type of the target file by the video call device comprises:

(a) transmitting a routing table acquisition request to the file push server by the video call device;

(b) broadcasting a routing table aggregating instruction to various video call devices in the system for responding to video call service, receiving routing information as returned by the various video call devices, and aggregating all routing information to generate the external routing table by the file push server;

(c) receiving the external routing table sent by the file push server, querying a local routing table of a server which the video call device is affiliated to and the external routing table, and determining a target server corresponding to the communication address by the video call device;

(d) acquiring a device identification of a target server corresponding to the communication address, and converting the device identification into a main coding factor by the video call device;

(e) determining a communication port number that needs to be called for transmitting the target file according to the file type, and generating a sub coding factor according to the communication port number by the video call device; and (f) acquiring the link number by the video call device based on the main coding factor and the sub coding factor.

2. The method for responding to video call service according to claim 1, wherein the system for responding to video call service further comprises at least one subscription server which has a subscription relationship with the file push server;

transmitting the target file to the call peer through the file transmission link corresponding to the link number by the file push server comprises:

pushing the target file by various subscription servers having the subscription relationship with the file push server; and transmitting, if the link number of the target file is included in a local link list of any one of the subscription servers, the target file to the call peer by the subscription server through the file transmission link corresponding to the link number of the target file.

3. The method for responding to video call service according to claim 1, wherein establishing the file uplink with the file push server and uploading the target file to the file push server through the file uplink by the video call device comprises:
dividing a bandwidth resource with a preset value from bandwidth resources allocated by the video call data transmission link and taking the bandwidth resource as a to-be-called bandwidth resource by the video call device;
establishing the file uplink based on an idle bandwidth resource at the current moment and the to-be-called bandwidth resource, and uploading the target file to the file push server through the file uplink by the video call device; and
releasing bandwidth resources of the file uplink and reallocating the to-be-called bandwidth resource to the video call data transmission link by the video call device, if the target file is detected to be uploaded to the file push server.

4. The method for responding to video call service according to claim 1, further comprising:
before establishing the file uplink with the file push server by the video call device,
acquiring a current network operation parameter by the video call device; and
storing the target file in a local database if the network operation parameter is lower than a preset operation parameter threshold value, and performing an operation of establishing the file uplink with the file push server by the video call device, when the network operation parameter is greater than or equal to the operation parameter threshold value.

5. A system for responding to video call service, comprising a video call device and a file push server, the video call device is configured to acquire an external routing table generated by the file push server; wherein:
the video call device is configured to:
(i) receive a video call service request, wherein the video call service request comprises a communication address of a call peer;
(ii) call a video call connection process to establish a video call data transmission link with the call peer based on a communication address, in response to the video call service request;
(iii) locally acquire, if a file transmission request sent by the call peer is received, a target file as indicated by the file transmission request and determine a link number of a file transmission link for transmitting the target file according to the communication address and a file type of the target file;
(iv) establish a file uplink with the file push server and upload the target file to the file push server through the file uplink, if the link number is not included in a local link list; wherein the local link list is configured to record link numbers of various transmission links under a server which the video call device is affiliated to; and
the file push server is configured to transmit the target file to the call peer through the file transmission link corresponding to the link number;
wherein the video call device is configured to determine the link number of the file transmission link for transmitting the target file according to the communication address and the file type of the target file by performing steps of:
(a) transmitting a routing table acquisition request to the file push server;
(b) broadcasting a routing table aggregating instruction to various video call devices in the system for responding to video call service, receiving routing information as returned by the various video call devices, and aggregating all routing information to generate the external routing table through the file push server;
(c) receiving the external routing table sent by the file push server, query querying a local routing table of a server which the video call device is affiliated to and the external routing table, and determining a target server corresponding to the communication address;
(d) acquiring a device identification of a target server corresponding to the communication address and converting the device identification into a main coding factor;
(e) determining a communication port number that needs to be called for transmitting the target file according to the file type and generating a sub coding factor according to the communication port number; and
(f) acquiring the link number based on the main coding factor and the sub coding factor.

6. The system for responding to video call service according to claim 5, further comprising at least one subscription server which has a subscription relationship with the file push server;
the file push server is configured to transmit the target file to the call peer through the file transmission link corresponding to the link number by performing steps of:
pushing the target file by various subscription servers having the subscription relationship with the file push server; and
transmitting the target file to the call peer through the file transmission link corresponding to the link number of the target file through the subscription server, if the link number of the target file is included in a local link list of any one of the subscription servers.

7. The system for responding to video call service according to claim 5, wherein the video call device is configured to establish a file uplink with the file push server and upload the target file to the file push server through the file uplink by performing steps of:
dividing a bandwidth resource with a preset value from bandwidth resources allocated by the video call data transmission link and taking the bandwidth resource as a to-be-called bandwidth resource;
establishing the file uplink based on an idle bandwidth resource at the current moment and the to-be-called bandwidth resource, and uploading the target file to the file push server through the file uplink; and
releasing bandwidth resources of the file uplink and reallocating the to-be-called bandwidth resource to the video call data transmission link, if the target file is detected to be uploaded to the file push server.

8. The system for responding to video call service according to claim 5, wherein the video call device is further configured to:
acquire a current network operation parameter; and store the target file in a local database if the network operation parameter is lower than a preset operation parameter threshold value, and perform an operation of establishing the file uplink with the file push server when the network operation parameter is greater than or equal to the operation parameter threshold value.

9. A system for responding to video call service, comprising a video call device and a file push server, the video call device comprise a first memory, a first processor and a first computer readable instruction stared in the first memory and executable by the first processor, the file push server comprise a second memory, a second processor and a second computer readable instruction stored in the second memory and executable by the second processor, the video call device is configured to acquire an external routing table generated by the file push server, both the video call device and the file push server are configured to perform the first/second computer readable instruction to perform the steps of:
- (i) receiving a video call service request by the video call device, wherein the video call service request comprises a communication address of a call peer;
- (ii) calling a video call connection process to establish a video call data transmission link with the call peer by the video call device based on the communication address, in response to the video call service request;
- (iii) locally acquiring a target file as indicated by a file transmission request, and determining a link number of a file transmission link for transmitting the target file according to the communication address and a file type of the target file by the video call device, if the file transmission request sent by the call peer is received;
- (iv) establishing a file uplink with the file push server and uploading the target file to the file push server through the file uplink by the first processor of the video call device, if the link number is not included in a local link list; wherein the local link list is configured to record link numbers of various transmission links under a server which the video call device is affiliated to; and
- (v) transmitting the target file to the call peer through the file transmission link corresponding to the link number by the second processor of the file push server;

wherein the first processor of the video call device is configured to locally acquire the target file as indicated by the file transmission request and determine the link number of the file transmission link for transmitting the target file according to the communication address and the file type of the target file by performing steps of:
- (a) transmitting a routing table acquisition request to the file push server;
- (b) broadcasting a routing table aggregating instruction to various video call devices in the system for responding to video call service, receiving routing information as returned by the various video call devices, and aggregating all routing information to generate the external routing table by the second processor of the file push server;
- (c) receiving the external routing table sent by the file push server, querying a local routing table of a server which the video call device is affiliated to and the external routing table, and determining a target server corresponding to the communication address;
- (d) acquiring a device identification of a target server corresponding to the communication address, and converting the device identification into a main coding factor;
- (e) determining a communication port number that needs to be called for transmitting the target file according to the file type and generating a sub coding factor according to the communication port number; and
- (f) acquiring the link number based on the main coding factor and the sub coding factor.

10. The system for responding to video call service according to claim 9, wherein the system for responding to call service further comprises at least one subscription server which has a subscription relationship with the file push server;
the second processor of the file push server is configured to transmit the target file to the call peer through the file transmission link corresponding to the link number by performing steps of:
pushing the target file by various subscription servers having the subscription relationship with the file push server; and
transmitting, if the link number of the target file is included in a local link list of any one of the subscription servers, the target file to the call peer through the file transmission link corresponding to the link number of the target file by the subscription server.

11. The system for responding to video call service according to claim 9, wherein the first processor of the video call device is configured to establish a file uplink with the file push server and upload the target file to the file push server through the file uplink by performing steps of:
dividing a bandwidth resource with a preset value from bandwidth resources allocated by the video call data transmission link and taking the bandwidth resource as a to-be-called bandwidth resource;
establishing the file uplink based on an idle bandwidth resource at the current moment and the to-be-called bandwidth resource, and upload uploading the target file to the file push server through the file uplink; and
releasing bandwidth resources of the file uplink and reallocating the to-be-called bandwidth resource to the video call data transmission link, if the target file is detected to be uploaded to the file push server.

12. The system for responding to video call service according to claim 9, wherein the first processor of the video call device is further configured to:
acquire a current network operation parameter; and
store the target file in a local database if the network operation parameter is lower than a preset operation parameter threshold value, and
perform an operation of establishing the file uplink With the file push server when the network operation parameter is greater than or equal to the operation parameter threshold value.

* * * * *